United States Patent
Proudlock

(10) Patent No.: US 9,730,382 B2
(45) Date of Patent: Aug. 15, 2017

(54) VEGETATION CUTTING DEVICE

(71) Applicant: BLACK & DECKER INC., Newark, DE (US)

(72) Inventor: David Proudlock, Durham (GB)

(73) Assignee: BLACK & DECKER INC., New Britain, CT (US)

( * ) Notice: Subject to any disclaimer, the term of this patent is extended or adjusted under 35 U.S.C. 154(b) by 448 days.

(21) Appl. No.: 14/444,486

(22) Filed: Jul. 28, 2014

(65) Prior Publication Data

US 2015/0034349 A1 Feb. 5, 2015

(30) Foreign Application Priority Data

Aug. 5, 2013 (EP) .................................... 13179227

(51) Int. Cl.
*A01D 34/00* (2006.01)
*A01D 34/78* (2006.01)
*A01D 34/90* (2006.01)

(52) U.S. Cl.
CPC .......... *A01D 34/006* (2013.01); *A01D 34/78* (2013.01); *A01D 34/90* (2013.01)

(58) Field of Classification Search
CPC .......... B25F 5/00; A01D 34/006; B23Q 5/043
USPC .............. 173/176, 213, 20, 46; 30/276, 347; 56/10.6; 180/65.31
See application file for complete search history.

(56) References Cited

U.S. PATENT DOCUMENTS

| | | | |
|---|---|---|---|
| 4,181,206 A | * | 1/1980 | Seilenbinder ...... A01D 34/6806 192/129 A |
| 4,259,782 A | | 4/1981 | Proulx |
| 4,307,325 A | * | 12/1981 | Saar ........................ B23B 45/02 318/472 |
| 4,607,431 A | | 8/1986 | Gay |
| 4,817,288 A | | 4/1989 | Hirose |
| 4,835,867 A | | 6/1989 | Collins et al. |
| 4,866,846 A | | 9/1989 | Hoffmann et al. |
| 4,897,923 A | | 2/1990 | Collins |
| 4,926,557 A | | 5/1990 | Haupt |
| 4,989,321 A | | 2/1991 | Hoffmann |
| 5,010,649 A | | 4/1991 | Hoffmann |
| 5,020,224 A | | 6/1991 | Haupt |
| 5,063,673 A | | 11/1991 | Webster |
| 5,109,607 A | | 5/1992 | Everts |
| 5,193,278 A | | 3/1993 | Osakabe et al. |

(Continued)

FOREIGN PATENT DOCUMENTS

| | | |
|---|---|---|
| DE | 202011000540 | 10/2011 |
| EP | 1183932 | 3/2002 |
| EP | 2499895 | 9/2012 |

*Primary Examiner* — Nathaniel Chukwurah
(74) *Attorney, Agent, or Firm* — John Yun

(57) ABSTRACT

A vegetation cutting device comprises: a housing; a motor mounted in the housing having a rotatable drive shaft; a gearing system comprising a rotatable output shaft, the gearing system adapted to be driven by the drive shaft; a rotatable cutting head mounted on the output shaft; a rotation sensor module mounted in the housing and configured to detect the rotational speed of the motor and configured to output a rotational speed signal; and a control module configured to determine the rotational speed of the cutting head based on the rotational speed signal and configured to control the speed of the motor in response to the determined rotational speed of the cutting head.

14 Claims, 5 Drawing Sheets

(56) References Cited

U.S. PATENT DOCUMENTS

| | | | |
|---|---|---|---|
| 5,276,968 A | 1/1994 | Collins et al. | |
| 5,311,665 A | 5/1994 | Sugihara et al. | |
| 5,339,526 A | 8/1994 | Everts | |
| 5,659,960 A | 8/1997 | Everts et al. | |
| 5,671,536 A | 9/1997 | Everts et al. | |
| 5,855,068 A | 1/1999 | Zilly et al. | |
| 5,881,464 A | 3/1999 | Collins et al. | |
| 5,881,465 A | 3/1999 | Brant et al. | |
| 5,887,348 A | 3/1999 | Iacona et al. | |
| 5,906,088 A * | 5/1999 | Inui | A01D 34/006 56/10.2 R |
| 6,148,523 A | 11/2000 | Everts et al. | |
| 6,320,286 B1 * | 11/2001 | Ramarathnam | H02K 11/33 310/47 |
| 6,594,907 B2 | 7/2003 | Wilson et al. | |
| D482,581 S | 11/2003 | Nyström et al. | |
| D482,941 S | 12/2003 | Nyström et al. | |
| 6,901,667 B2 | 6/2005 | Proulx | |
| 7,346,992 B2 * | 3/2008 | Hunger | B23D 47/126 30/276 |
| 7,360,312 B2 * | 4/2008 | Warashina | A01D 34/90 30/276 |
| 7,412,768 B2 | 8/2008 | Alliss | |
| 7,823,291 B2 | 11/2010 | Shibasaki et al. | |
| 7,966,736 B2 | 6/2011 | Arnetoli | |
| 8,025,249 B2 | 9/2011 | Alliss et al. | |
| 2003/0006872 A1 | 1/2003 | Basu | |
| 2006/0026846 A1 | 2/2006 | Alliss | |
| 2007/0210733 A1 * | 9/2007 | Du | H02K 1/278 318/268 |
| 2008/0001596 A1 * | 1/2008 | Clayton | B23Q 1/70 324/174 |
| 2009/0260237 A1 | 10/2009 | Alliss | |
| 2012/0066912 A1 | 3/2012 | Ferrell et al. | |
| 2012/0066913 A1 | 3/2012 | Alliss et al. | |
| 2012/0228041 A1 * | 9/2012 | Borinato | H02P 7/29 180/65.31 |

* cited by examiner

VEGETATION CUTTING DEVICE

CROSS-REFERENCE TO RELATED APPLICATIONS

This application claims priority to European Patent Application No. 13179227.7 filed Aug. 5, 2013. The entire contents of that application are expressly incorporated herein by reference.

FIELD OF THE INVENTION

The present invention relates to a vegetation cutting device. In particular the present invention relates to a vegetation cutting device with cutting speed control.

BACKGROUND OF THE INVENTION

Vegetation cutting devices such as string trimmers are known power operated tools for cutting grass and other foliage and vegetation. Typically string trimmers are powered by petrol or electricity and an engine or motor drives a cutting head. The cutting head can comprise one or more rotating blades, in which case the trimmer is generally known as a brush cutter or one or more rotating cutting lines, in which case it is known as a string trimmer.

A vegetation cutting device such as a string trimmer comprises a rotating cutting head with a cutting line mounted thereto. Rotation of the cutting head causes the cutting line to rotate which defines a cutting swath. The cutting line rotates and the leading edge of the cutting line impacts and cuts vegetation. During use of a string trimmer the speed of the cutting line can vary depending on how the string trimmer is used. For example when the cutting line is use with heavy vegetation, the cutting head can slow down or even stall. When the cutting head rotates at a slower speed, the cutting line will not cut the vegetation.

It is known to control the speed on vegetation cutting devices. For example EP2499895 discloses a lawn mower which includes a speed control device which can maintain a constant speed control. The lawn mower comprises a speed sensor which is mounted in the housing and the speed sensor detects the speed of the blade. The speed of the blade is detected with magnets mounted on the blade. A problem with the speed sensor is that it is dependent on a precise positional relationship with the blade. If the blade hits a rock, the blade can be deformed or the magnet can be dislodged and the speed sensor may not be able to detect the rotation of the blade. Furthermore the magnet on the blade has to be replaced every time the blade is replaced.

DE202011000540 discloses a brush cutter with a speed sensor and a speed control system. The speed sensor comprises a hall sensor and a magnet mounted on the motor. A problem with this brush cutter is that the cutting head rotates at the same speed as the motor. This means that the motor is inclined to stall when the cutting head is used in heavy vegetation and the speed of the cutting head is reduced. In order to maintain a constant speed, the speed control system has to adapt to large changes in the speed of the motor. This means that significant energy is required to maintain the cutting head at the constant cutting speed.

Embodiments of the present invention aim to address the aforementioned problems.

SUMMARY OF THE INVENTION

According to an aspect of the present invention there is a vegetation cutting device comprising: a housing; a motor mounted in the housing having a rotatable drive shaft; a gearing system comprising a rotatable output shaft, the gearing system adapted to be driven by the drive shaft; a rotatable cutting head mounted on the output shaft; a rotation sensor module mounted in the housing and configured to detect the rotational speed of the motor and configured to output a rotational speed signal; and a control module configured to determine the rotational speed of the cutting head based on the rotational speed signal and configured to control the speed of the motor in response to the determined rotational speed of the cutting head.

By locating the rotational sensor on the motor, the rotation sensor is not damaged during use of the vegetation cutting device. Furthermore the user is not able to interfere with the rotation sensor during maintenance of the vegetation cutting device such as when the user changes the cutting head. By providing a gearing system, the rotation of the cutting head can be determined from the detected rotational speed of the motor. Therefore the speed of the cutting head can be determined without directly mounting the cutting head on the drive shaft of the motor.

Preferably the rotation sensor module comprises a magnet mounted on the drive shaft and a Hall sensor configured to detect rotation of the magnet. Alternatively the rotation sensor module can comprise one or more of the following inductive pick up sensor, slotted optical switch, or analogue tachometer. In other embodiments any other suitable means for detecting rotation can be used. Preferably the drive shaft is coupled to the gearing system at a first end and the magnet is mounted at a second end of the drive shaft and the second end of the drive shaft extends out of the motor on a side opposite to the first end. Preferably the magnet is an annular multipole magnet. The magnet rotates at the same speed as the drive shaft of the motor. The Hall sensor detects the rotation of the drive shaft whenever the magnetic poles move past the Hall sensor. A plurality of poles means the Hall sensor detects rotation of the drive shaft more than once per revolution of the drive shaft.

Preferably the gearing system is configured to reduce the speed of the gearing shaft with respect to the drive shaft. This means that the output shaft rotates at a slower speed than the drive shaft. In this way the torque experienced at the output shaft is increased. This means that the cutting head will cut better in heavy vegetation.

Since the drive shaft will be rotating faster than the output shaft, the rotation sensor module will detect more revolutions of the drive shaft for each revolution of the output shaft. This means that the sampling rate of the rotational speed of the cutting head is increased compared to if the rotational sensor module was configured to directly measure the rotational speed of the cutting head.

By increasing the sampling rate of the rotational speed of the cutting head, the control module is able to more quickly determine whether the speed of the cutting head changes. This means that the control module can make faster and smaller variations in the motor speed to adapt to the changing conditions at the cutting head.

Preferably the gearing system comprises a first gear coupled to the drive shaft and a second gear coupled to the output shaft and the gear ratio of the first gear to the second gear is 0.35. The first gear may have 21 teeth and the second gear may have 60 teeth. Alternatively the gearing system can be any combination of gears to provide a step down.

Preferably the control module is configured to determine the cutting head speed based on the predetermined ratio of the gearing system between the drive shaft and the gearing shaft. Preferably the control module is configured to maintain the cutting head at a predetermined rotational cutting speed. Preferably the predetermined rotational cutting speed is a minimum speed for cutting vegetation. This means that the cutting head will always be able to cut vegetation in any circumstance. If the cutting head drops below the minimum speed, the control module can increase the speed of the motor accordingly.

Preferably the predetermined rotational cutting speed is below a maximum rotational cutting speed. When no load is on the cutting head, for example the cutting head is rotating when it is not cutting vegetation, the vegetation cutting device will be wasting energy if the cutting head is rotating above the minimum speed for cutting vegetation. By maintaining the speed of the cutting head below a maximum rotational cutting speed and above the minimum rotational cutting speed, the vegetation cutting speed saves energy, but is always able to cut vegetation.

Preferably the control module is mounted in the housing remote from the rotation sensor module. In this way the control module can be mounted in the handle away from the cutting head and the control module can be electrically connected to the rotation sensor module by wires. This means that the control module can be insulated from shock and vibration which may be greater closer to the cutting head.

Preferably the control module changes the rotational speed of the cutting head by modifying a pulse width modulation signal for driving the motor. Preferably the vegetation cutting device comprises a battery and the control module is configured to increase the duration of the pulse width modulation signal to the motor as the voltage across the battery decreases.

Preferably the rotation sensor module is electrically connected to the motor. This means that the rotation sensor is powered from the motor. In this way a single wire for transmitting the rotation speed signal is required to connect the control module and the rotation sensor module. This saves on wire required to incorporate the speed control into the vegetation cutting device.

BRIEF DESCRIPTION OF THE DRAWINGS

Various other aspects and further embodiments are also described in the following detailed description and in the attached claims with reference to the accompanying drawings, in which:

DETAILED DESCRIPTION OF THE INVENTION

Figure 1:
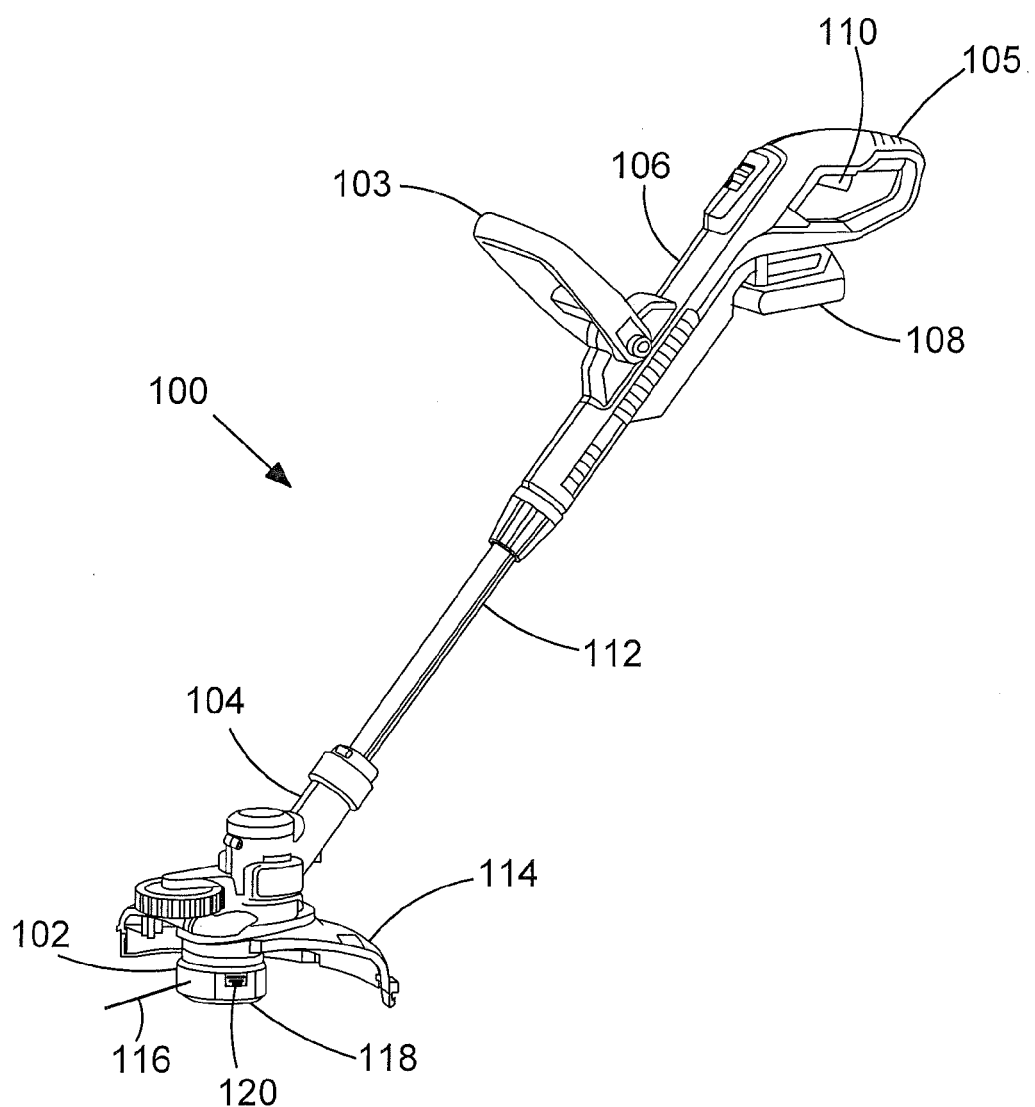
FIG. 1 shows a perspective view of the vegetation cutting device.

FIG. 1 shows a perspective view of a vegetation cutting device 100.

FIG. 1 shows a perspective view of a vegetation cutting device or string trimmer 100. Typically the vegetation cutting device 100 is a string trimmer and the term string trimmer will be used hereinafter, but the vegetation cutting device can alternatively be other devices suitable for cutting vegetation. For example the vegetation cutting device can be a lawn mower comprising a cutting line.

In some embodiments the string trimmer 100 comprises a cutting head housing 104 for housing a motor 202 and other components. The cutting head housing 104 can comprise two clam shell portions which are fixed together to enclose the motor and other components. A cutting head 102 is rotatably mounted to the cutting head housing 104 and the cutting head 102 connected to the motor 202 via a rotatable drive shaft 212. The cutting head comprises a cutting element 116 configured to cut vegetation when the cutting head 102 is rotated. The cutting element 116 in some embodiments is a flexible element or filament and shall be hereinafter referred to as a cutting line 116.

The cutting head housing 104 is connected to a first end of a shaft 112 and a handle housing 106 is connected to a second end the shaft 112. The handle housing 106 comprises a secondary handle 103 and a primary handle 105 mounted on the handle housing 106. The handles 103, 105 are configured so that the user can grip and operate the string trimmer 100. The handle housing 106 can comprises two clam shell portions which are fixed together to enclose circuit board 204. The cutting head housing 104 can enclose a circuit board 204 as well. A battery 108 may be mounted on the handle housing 106 for providing a direct current (DC) voltage to the motor. The motor is actuated with a trigger switch 110.

The cutting head 102 comprises a cap 118 which is removable from the cutting head 102 so that the user can install or maintain the cutting string 116. The cap 118 comprises a pair of resilient tabs 120. The resilient tabs 120 are depressible and when the user depresses the resilient tabs 120, the resilient tabs 120 disengage from the cutting head 102 and allow the user to remove the cap 118.

Figure 2:
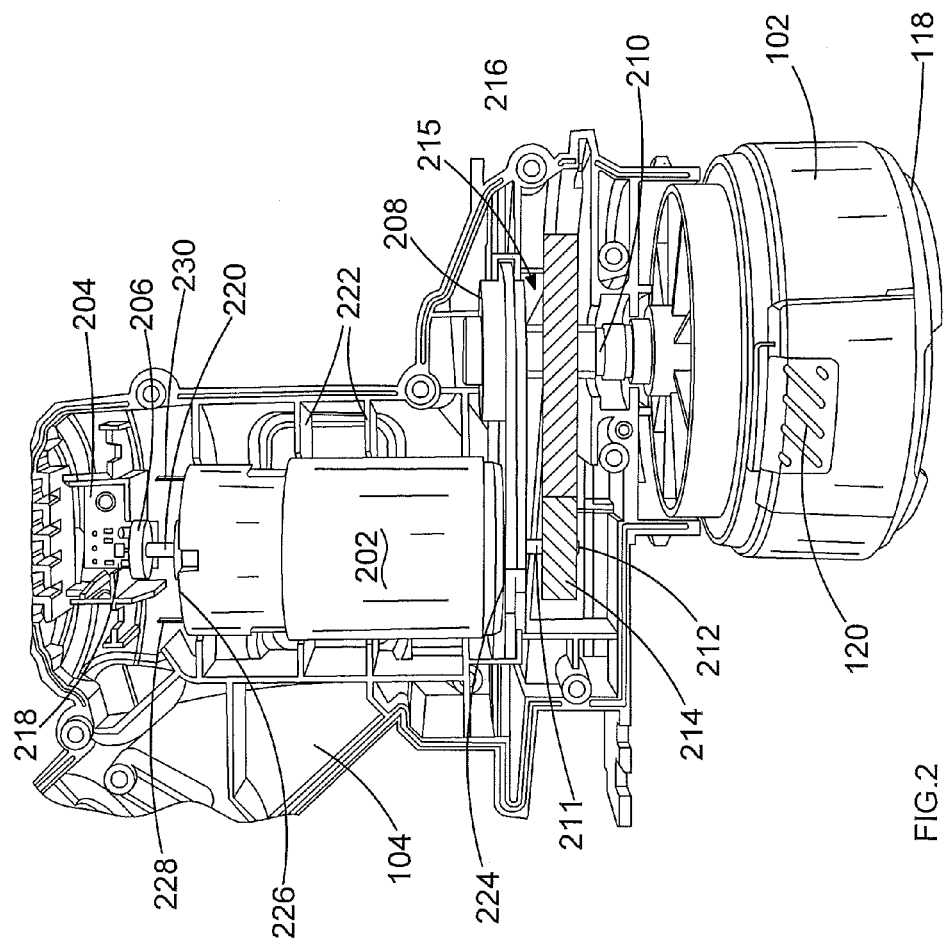
FIG. 2 shows partial cut away side view of the vegetation cutting device.

The internal structure of the string trimmer 100 will now be discussed in reference to FIG. 2. FIG. 2 discloses a partial cut away side view of the string trimmer 100. One half of the clam shell of the cutting head housing 104 has been removed for clarity. The motor 202 is mounted in the cutting head housing 104 with a plurality of ribs 222. The motor 202 is powered from the battery 108. Connecting wires (not shown) run down the shaft 112 and connect the motor 202 with the battery 108 and a control module 300. The motor 202 is mounted in the hosing 104 such that the axis of rotation of the motor 202 is substantially vertical during use. The motor 202 comprises a rotatable drive shaft 211 having a first end 212 for driving the cutting head 102. The first end 212 of the rotatable drive shaft 211 extends from a first face 224 of the motor and a first gear 214 is mounted on a first end 212 of the drive shaft 211. A second end 220 of the drive shaft 211 extends from a second face 226 of the motor 202. A rotational sensor 115 configured to detect rotation of the second end 220 of the motor 202 when the motor 202 is operational.

In some embodiments an annular 4-pole magnet 206 is mounted on the second end 220 of the drive shaft 211. The annular 4 pole magnet comprises four sections comprising alternating north and south poles. In some embodiments the magnet 206 may comprise any number of poles. The magnet 206 is configured to rotate with the drive shaft 211 when the motor 202 is operational. The magnet 206 is arranged to be orientated next to a Hall effect sensor 218 mounted on a rotation sensor module 204. The rotation sensor module 204 can be a printed circuit board (PCB). The rotation sensor module 204 comprises a memory 306 and a processor 308.

The processor 308 executes one or more instructions in memory to perform the functions described with reference to the embodiments. The rotation sensor module 204 can be hardware, software or a combination of both. The rotation sensor module 204 is mounted in the cutting head housing 104. The rotation sensor module 204 is electrically connected to the control module 300 by wires (not shown). The control module 300 powers the rotation sensor module 204. Furthermore a data wire (not shown) connects the rotation sensor module 204 with the control module 300 for sending rotation speed signals. In some other embodiments the rotation sensor module 204 is electrically connected by wires (not shown) to the terminals 228, 230, of the motor 202. By connecting the rotation sensor module 204 to the motor terminals 228, 230, two power wires do not have to be threaded through the shaft 112 of the string trimmer. Instead only the data wire is required to connect the rotation sensor module 204 and the control module.

The Hall sensor 218 is configured to detect either the south poles or the north poles. This means that for each revolution of the drive shaft 211, the Hall sensor 218 will detect two poles of the same kind (e.g. the two south poles) moving. In some embodiments, each time the Hall sensor detects a magnetic pole, a pulse signal is sent from the rotation sensor module 204 to the control module 300. The control module 300 then determines the rotational speed from the pulse signal. In some other embodiments, the rotation sensor module 204 determines the speed and sends a signal comprising rotational speed information. This means that the control module 300 does not have to determine the rotational speed of the motor 202.

The first gear 214 is part of a gearing system 215. The gearing system 215 comprises a plurality of gears. In one embodiment the gearing system 215 comprises the first gear 214 and a second gear 216. The gearing system 215 can comprise any number of gears to achieve a suitable gearing ratio. The gearing system 215 comprises an output shaft 210 and the cutting head 102 is mounted thereon. The output shaft 210 is configured to drive the cutting head 102 when the drive shaft 211 rotates.

The gearing system 215 comprises a gearing ratio to reduce the speed of rotation of the output shaft 210 with respect to the drive shaft 211. In some embodiments the gearing ratio of the first gear 214 with respect to the second gear 216 is 0.35. In some embodiments the first gear 214 comprises 21 teeth and the second gear 216 comprises 60 teeth. In alternative embodiments there may be any suitable gearing ratio which is less than 1.

The motor 202 is mounted on a bearing plate 208. The bearing plate is rigidly connected to the housing 104 and keeps the orientation of the drive shaft 211 and the output shaft 210 fixed with respect to each other.

Figure 3:
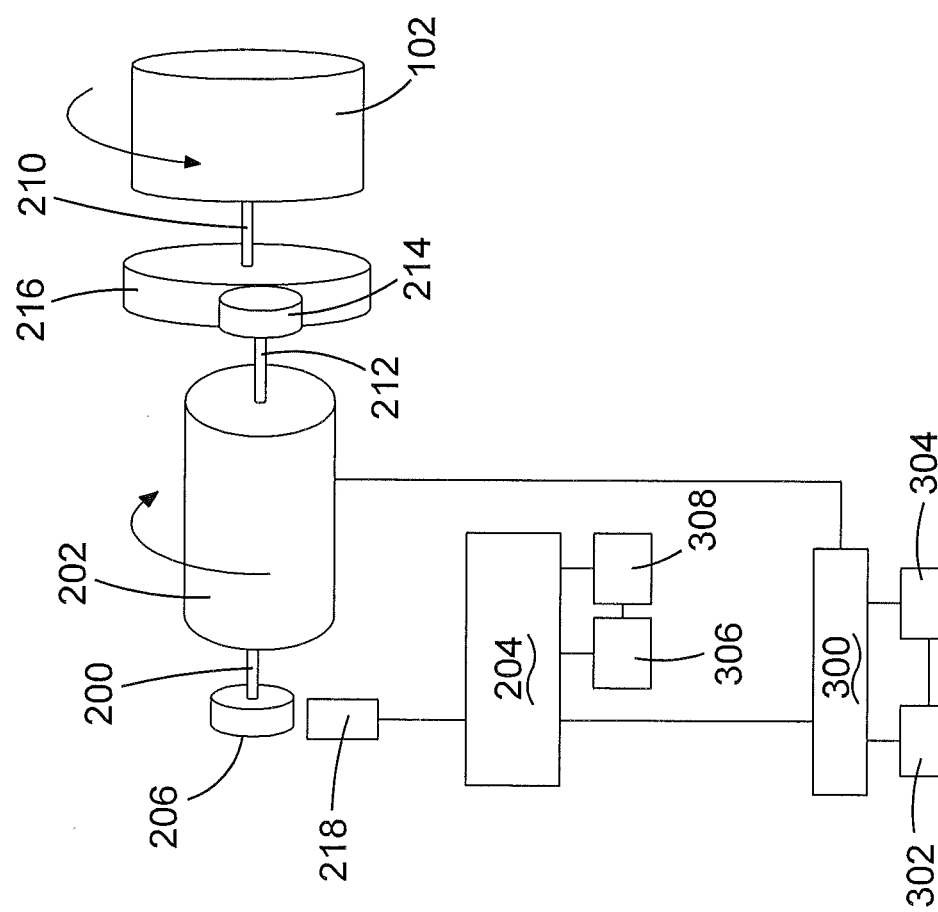
FIG. 3 shows a schematic representation of the vegetation cutting device.
Figure 4:
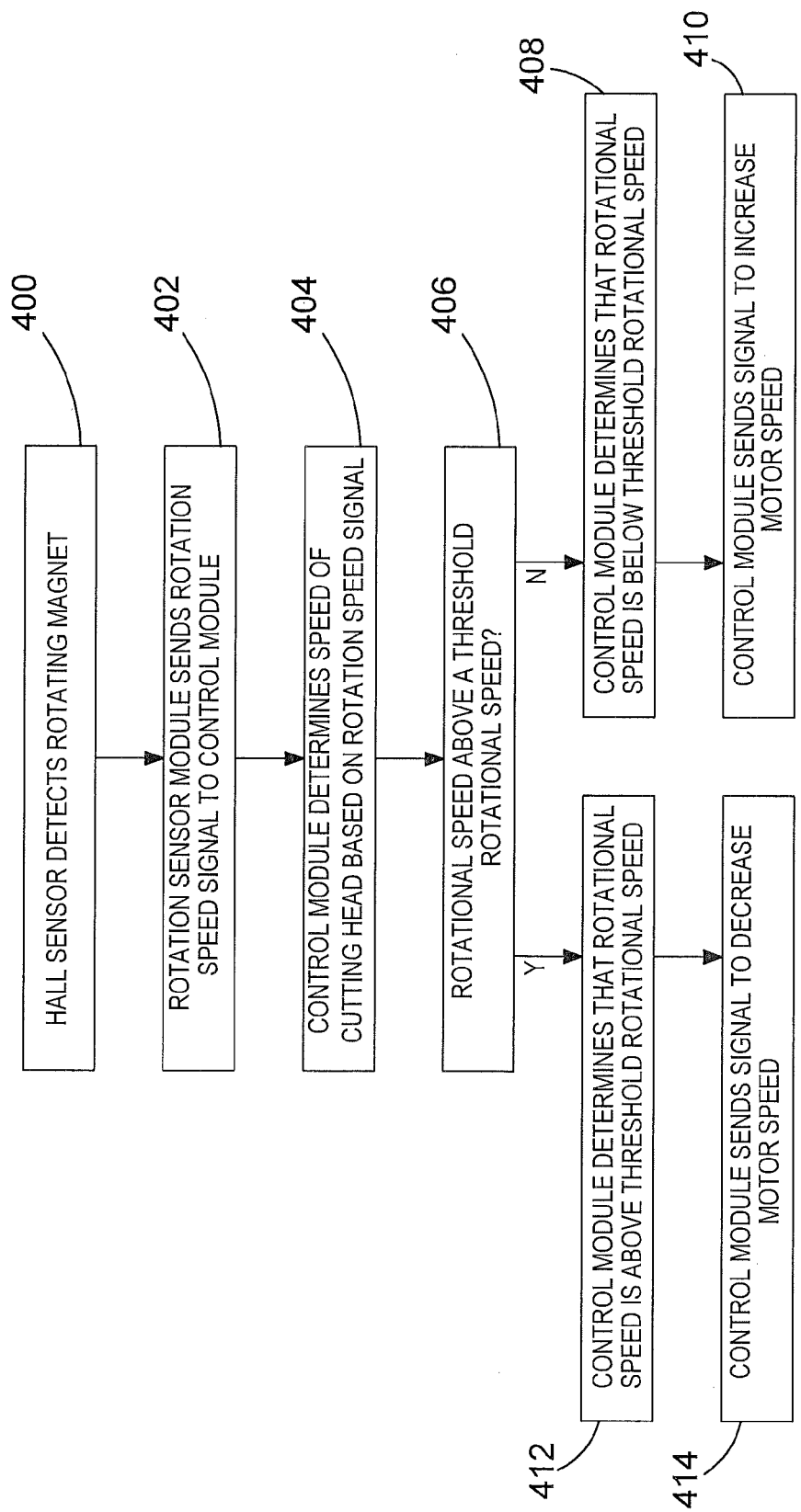
FIG. 4 shows a flow diagram of the speed control of the vegetation cutting device.

Operation of the string trimmer 100 will be discussed in reference to FIG. 3 and FIG. 4. FIG. 3 shows a schematic diagram of the string trimmer 100. FIG. 4 shows a flow diagram of the speed control of the string trimmer 100. When the drive shaft 211 of the motor 202 rotates, as shown by the arrow, both the magnet 206 and the first gear 214 also rotate in the same direction and the same speed. The cutting head 102 and the second gear 216 are mounted on the output shaft 210 and will rotate in an opposite direction to the drive shaft 211. The output shaft 210 will rotate 0.35 times for every revolution of the drive shaft 211.

As the drive shaft 211 rotates, so the magnet 206 rotates past the Hall sensor 218. Each time one or both of the poles passes the Hall sensor a change in polarity is detected. The change in polarity causes a signal to be sent to the rotation detection module. In some embodiments each time a south pole of the magnet 206 rotates past the Hall sensor 218, the Hall sensor 218 detects the rotating magnet as shown in block 400 of FIG. 4. Alternatively when the north pole passes the Hall sensor a signal is detected and sent to the rotation detection module. The rotational sensor module 204 receives the signal from the Hall sensor 218 and sends a rotational speed signal to the control module 300 as shown in block 402. Since there are 2 south poles on the magnet 206, the rotational speed signal is a periodic pulse whose frequency is equal to twice the angular frequency corresponding to the rotational speed of the drive shaft 211:

$$f_{signal} = \omega_{drive\ shaft}/4\pi \qquad [1]$$

The control module 300 is a PCB mounted in the string trimmer 100 remote from the cutting head 102. The control module 300 comprises a memory 302 and a processor 304. In some other embodiments the memory 302 and processor 304 are combined in a chipset. Alternatively the memory 302 and processor 304 are separate elements. The processor 304 executes one or more instructions in memory to perform the functions described with reference to the embodiments. The control module 300 can be hardware, software or a combination of both. In some embodiments the control module 300 is mounted in the handle housing 106. Mounting the control module 300 away from the cutting head 102 means that the control module is subjected to less shocks and vibrations.

The control module 300 determines the rotational speed of the motor 202 based on the received rotational speed signal using equation [1] as shown in block 404. The control module 300 determines the rotational speed of the cutting head 102 because the motor 202 rotates faster than the cutting head 102 by a predetermined ratio as set by the gearing system 215. For example the control module 300 can determine that the rotational speed of the cutting head as follows:

$$\omega_{output\ shaft} = \text{Gearing ratio} \times 4\pi \times f_{signal} \qquad [2]$$

In some embodiments the gearing ratio is 0.35. Alternatively this can be any ratio below 1 such that the output shaft 210 rotates slower than the drive shaft 211.

In some alternative embodiments the rotation sensor module 204 carries out block 404 and sends information comprising the determined cutting head rotation speed to the control module 300. In this way the control module 300 determines the cutting head rotation speed based on the received information from the rotation sensor module 204.

The control module 300 then determines whether the rotational speed of the cutting head 102 is above a threshold rotational speed as shown in block 406. In some embodiments the threshold rotational speed is the minimum rotational speed necessary to cut vegetation. In some embodiments the threshold rotational speed of the cutting head is 5500 rpm. The threshold rotational speed is below the maximum rotational speed of the motor 202. The threshold rotational speed is stored in memory 302 of the control module 300. The control module 300 compares the threshold rotational speed with the determined rotational speed of the cutting head 102.

In some embodiments the speed of the cutting head 102 is not directly calculated. Instead the control module 300 only uses the determined speed of the motor 202 in block 404. The control module 300 can indirectly determine the rotational speed on the cutting head 102 based on the rotational speed of the motor 202. The ratio of the rotational speed of the drive shaft 211 and the output shaft 210 is predetermined by the gearing system 215. The control module 300 can compare the determined rotational speed of the motor 202 against a threshold rotational speed of the motor 202, which infers the same comparison between the rotational speed of the cutting head 102 and a threshold rotational speed on the cutting head 102. For example the threshold rotational speed of the motor can be 15714 rpm, which corresponds to a cutting head rotational speed of 5500 rpm.

If the control module 300 determines that the rotational speed of the cutting head 102 is above a threshold rotational speed as shown in block 412, then the control module 300 sends a signal to decrease the motor speed as shown in block 414. If the control module 300 determines that the rotational speed of the cutting head 102 below the threshold speed as shown in block 408, then the control module 300 sends a signal to increase the motor speed as shown in block 410.

In some embodiments the motor 202 is a brushless DC motor. In other embodiments the motor 202 is a brushed DC motor. The motor 202 can comprise an rotatable inner core which spins with respect to an outer motor housing. Alternatively the motor 202 can comprise an outer shell which spins with respect to a fixed inner core.

Figure 5:
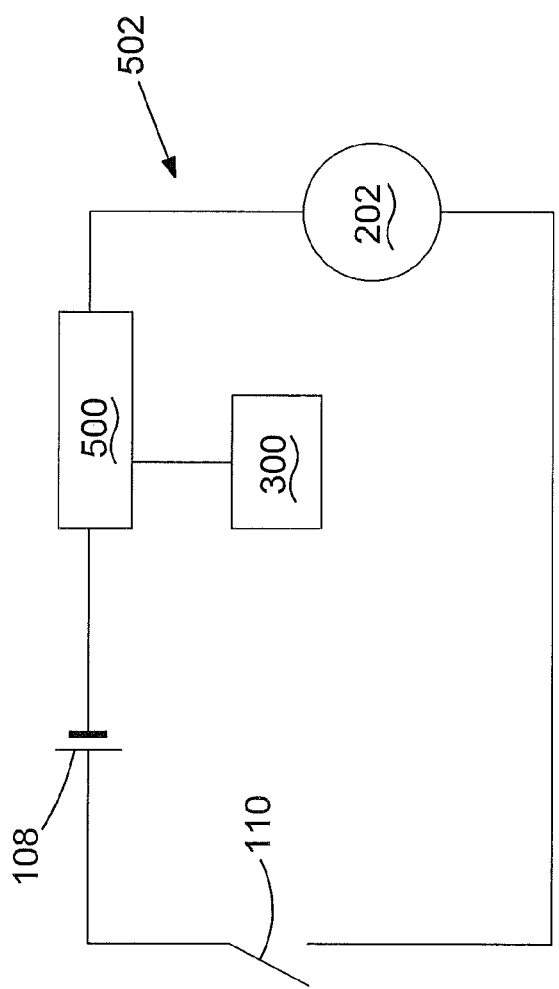
FIG. 5 shows a circuit diagram of the vegetation cutting device.

The control module 300 increases or decreases the motor speed as shown in blocks 414 or 410 by sending a control signal to a pulse width modulation controller 500. In some embodiments the pulse width modulation controller 500 and the control module 300 are the same. FIG. 5 discloses a circuit diagram for varying the rotational speed of the motor with pulse width modulation (PWM). The circuit 502 is a direct current (DC) circuit which comprises a PWM controller 500 configured switch the voltage "ON" periodically according to a duty cycle. The PWM controller 500 comprises a known integrated circuit or electronic components for pulse with modulation of a DC voltage. The PWM controller 500 is configured to vary the duty cycle and the amount of time the voltage is switched "ON" and this controls the voltage supplied to the motor 202.

Figure 6:
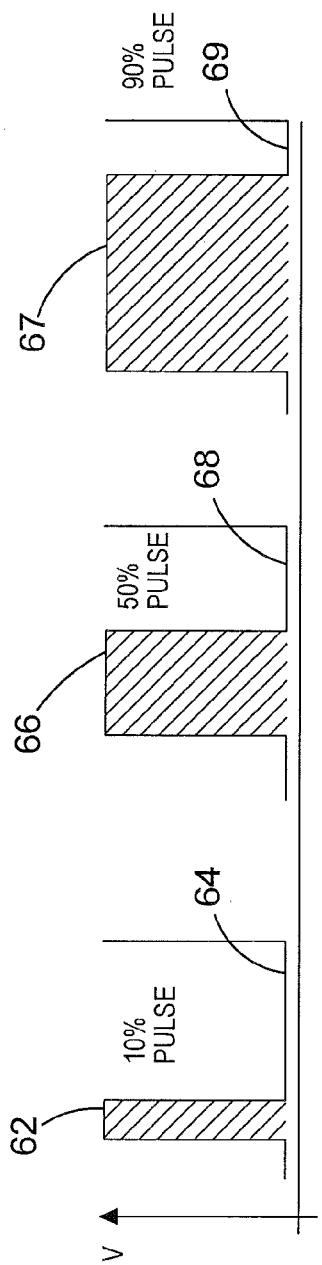
FIG. 6 shows a schematic representation of pulse width modulation used in the vegetation cutting device.

FIG. 6 shows a graphical representation of pulses of different width. The PWM controller 500 can vary the duty cycle and duration that the voltage is "ON" in each the pulse sent to the motor 202. The width of the pulse determines the amount of voltage supplied to the motor and how fast the motor is rotating. The PWM controller 500 can supply a constant voltage or a duty cycle of 100% to the motor and in this case the motor will be operating at full speed. When the motor speed is reduced, the PWM controller 500 adjusts the duty cycle and reduces the duration of ON pulses.

FIG. 6 shows three examples ON pulses 62, 66, 67 for different duty cycles. For example the PWM controller 500 control the circuit with a duty cycle having a 10% pulse width 62, a 50% pulse width 66 or a 90% pulse width 67. For comparison each pulse 62, 66, 67 has a respective "OFF" period. This means that the speed of the motor 202 can be adjusted to a variety of speeds with the PWM controller 500. The PWM controller 500 changes the pulse width in response to a signal sent from the control module 300. The PWM controller 500 can control the pulse widths such that the full width (100% duty cycle) maximum voltage is across the motor 202 if the motor 202 stalls. Additionally or alternatively the PWM controller 500 can be configured to supply a plurality of different pulse widths to the motor 202. Momentum and inertia of the rotating motor 202 means that the motor 202 continues to rotate even in the periods when no voltage is supplied. The PWM controller 500 can control the pulse with known algorithms such as proportional integral (PI) or proportional integral derivative (PID).

In operation the output shaft 210 rotates at a slower speed than the drive shaft 211. In this way the torque experienced at the output shaft 210 is increased. This means that the cutting head 102 will cut better in heavy vegetation than if the cutting head 102 were mounted directly on the drive shaft 211.

Since the drive shaft 211 will be rotating faster than the output shaft 210, the rotation sensor module 204 will detect more revolutions of the drive shaft 211 for each revolution of the output shaft 210. This means that the sampling rate of the rotational speed of the cutting head 102 is increased compared to if the rotational sensor module 204 was configured to directly measure the rotational speed of the cutting head 102.

By increasing the sampling rate of the rotational speed of the cutting head 102, the control module 300 is able to more quickly determine whether the speed of the cutting head 102 changes. This means that the control module 102 can make faster and smaller variations in the motor speed to adapt to the changing conditions at the cutting head 102. This saves energy and extends the runtime of the battery 108.

In some embodiments the control module is connected to an override switch (not shown). The override switch is a user operated switch which allows the user to control the maximum available power to the motor. The override switch stops the speed control system maintaining the motor 202 at a predetermined speed and provides maximum or increased power to the motor. This means that the user can manually speed up the motor when the speed control system is in operation. The override switch can be a depressible switch, which only delivers maximum or increased power to the motor 202 when the switch is depressed. After the user releases the override switch, the speed control system resumes maintaining the speed of the motor 202. For example, if the user is using the string trimmer in particularly heavy vegetation, the user can immediately switch to full power.

In some embodiments the control module 300 can control the discharge of the battery 108. The control module 300 can determine when the battery 108 is nearly depleted and shut off the string trimmer 100. This means that the lifetime of the batteries 108 can be prolonged.

In some embodiments the control module 300 is configured to automatically shutdown the string trimmer 100 under certain conditions. The control module 300 is configured to determine when the speed of the motor 202 falls below a minimum operating speed. The minimum operating may be slower than the threshold speed for cutting vegetation. The minimum operating speed is typically a speed of the cutting head 102, below which the motor 202 may stall or be vulnerable to damage. When the motor 202 slows down by being force against an object the current drawn increases and in prolonged instances where the motor 202 is jammed, the motor 202 may burn out or be damaged. In some embodiments the control module 300 is configured to stop power to the motor 202 when the speed of the cutting head 102 falls below a predetermined minimum operating speed. In some embodiments the control module 300 shuts power off to the motor 202 when the speed of the cutting head 102 falls below 3500 rpm. In this way the control module 300 can detect when the string trimmer 100 is "plunged" into heavy vegetation or forced on the ground and automatically shuts off power to the motor 202.

In some embodiments the control module 300 comprises a fail-safe mode. If the control module 300 determines that the speed control system is malfunctioning then the control module 300 is configured to stop the speed control system.

For example the control module 300 may determine that the no signal is being received from the Hall sensor 218 or the rotation sensor module 204. The control module 300 turns off the speed control system and provides open loop control to the motor 202. In this way the control module 300 can provide functionality of the string trimmer 100 to the user even if the speed control system fails.

In some other embodiments the string trimmer 100 can comprise a user operable power control switch (not shown) for the user to set the power level of the motor 202. The power control switch can be any suitable switch for controlling the power to the motor. For example the power control switch may comprise a potentiometer. This provides multiple user selectable power settings of the motor 202. In this way the speed control system can be maintained at a plurality of different threshold cutting speeds e.g. a slower battery saving mode and a higher more powerful mode.

Another embodiment of the present invention comprises a combination of one or more of the embodiments mentioned. Embodiments of the present invention have been discussed with particular reference to the examples illustrated. However it will be appreciated that variations and modifications may be made to the examples described within the scope of the invention.

The invention claimed is:

1. A vegetation cutting device comprising:
   a shaft having a handle housing on one end and a cutting head housing on an opposite end;
   a motor mounted in the cutting head housing, the motor having a rotatable drive shaft;
   a gearing system comprising a rotatable output shaft, the gearing system adapted to be driven by the drive shaft;
   a rotatable cutting head mounted on the output shaft, the rotatable cutting head having a cutting line extending therefrom, the cutting line used to cut vegetation;
   a rotation sensor module mounted in the housing and configured to detect the rotational speed of the motor and configured to output a rotational speed signal; and
   a control module configured to determine the rotational speed of the cutting head based on the rotational speed signal and configured to control the speed of the motor in response to the determined rotational speed of the cutting head.

2. The vegetation cutting device according to claim wherein the rotation sensor module comprises a magnet mounted on the drive shaft and a Hall sensor configured to detect rotation of the magnet.

3. The vegetation cutting device according to claim 2 wherein the drive shaft is coupled to the gearing system at a first end and the magnet is mounted at a second end of the drive shaft and the second end of the drive shaft extends out of the motor on a side opposite to the first end.

4. The vegetation cutting device according to claim 3 wherein the magnet is an annular multi-pole magnet.

5. The vegetation cutting device according claim 1 wherein the gearing system is configured to reduce the speed of the gearing shaft with respect to the drive shaft.

6. The vegetation cutting device according to claim 5 wherein the gearing system comprises a first gear coupled to the drive shaft and a second gear coupled to the output shaft and the gear ratio of the first gear to the second gear is 0.35.

7. The vegetation cutting device according to claim 1 wherein the control module is configured to determine the cutting head speed based on the predetermined ratio of the gearing system between the drive shaft and the output shaft.

8. The vegetation cutting device according claim 7 wherein the control module is configured to maintain the cutting head at a predetermined rotational cutting speed.

9. The vegetation cutting device according to claim 8 wherein the predetermined rotational cutting speed is a minimum speed for cutting vegetation.

10. The vegetation cutting device according to claim 9 wherein the predetermined rotational cutting speed is below a maximum rotational cutting speed.

11. The vegetation cutting device according to claim 1 wherein the control module is mounted in the cutting head housing remote from the rotation sensor module.

12. The vegetation cutting device according to claim 1 wherein the control module changes the rotational speed of the cutting head by modifying a pulse width modulation signal for driving the motor.

13. The vegetation cutting device according to claim 12 wherein the vegetation cutting device comprises a battery and the control module is configured to increase the duration of the pulse width modulation signal to the motor as the voltage across the battery decreases.

14. The vegetation cutting device according to claim 1 wherein the rotation sensor module is electrically connected to the motor.

* * * * *